United States Patent
O'Hanlon, Jr. et al.

[15] 3,699,949
[45] Oct. 24, 1972

[54] PULSE JITTER MEASUREMENT ESPECIALLY FOR HEART BEAT MEASUREMENT

[72] Inventors: James F. O'Hanlon, Jr.; Glenn A. Sanderson, both of Santa Barbara, Calif.

[73] Assignee: Human Factors Research Incorported, Goleta, Calif.

[22] Filed: July 26, 1971

[21] Appl. No.: 165,947

[52] U.S. Cl............128/2.06 A, 324/78 E, 324/78 Z, 324/186, 328/151
[51] Int. Cl................................................A61b 5/04
[58] Field of Search ....324/186, 187, 188, 189, 78 E; 328/129, 130, 146, 151; 128/2.05 R, 2.06 A, 2.06 B, 2.06 F, 2.06 R

[56] References Cited

UNITED STATES PATENTS

| | | |
|---|---|---|
| 2,492,617 | 12/1949 | Boland et al. .........128/2.06 F |
| 2,645,755 | 7/1953 | Garfield ..................324/78 E |
| 2,955,202 | 10/1960 | Scouvtes ..................324/78 Z |
| 3,438,367 | 4/1969 | Karsh et al............128/2.06 A |
| 3,504,194 | 3/1970 | Eastman et al. ............328/151 |
| 3,602,222 | 8/1971 | Herndon ...............128/2.06 F |

Primary Examiner—William E. Kamm
Attorney—Harris, Kern, Wallen & Tinsley

[57] ABSTRACT

Apparatus for measuring the difference in intervals between pulses of a pulse train and providing a continuous output indicative of the interval variation or the pulse jitter. Circuitry having the pulse train as an input and including a pair of interval timers, for producing a series of constant width pulses related to the input pulses in amplitude and repetition rate. An averager and a difference amplifier for providing an output which is a function of the difference between each pulse interval and the average pulse interval.

8 Claims, 3 Drawing Figures

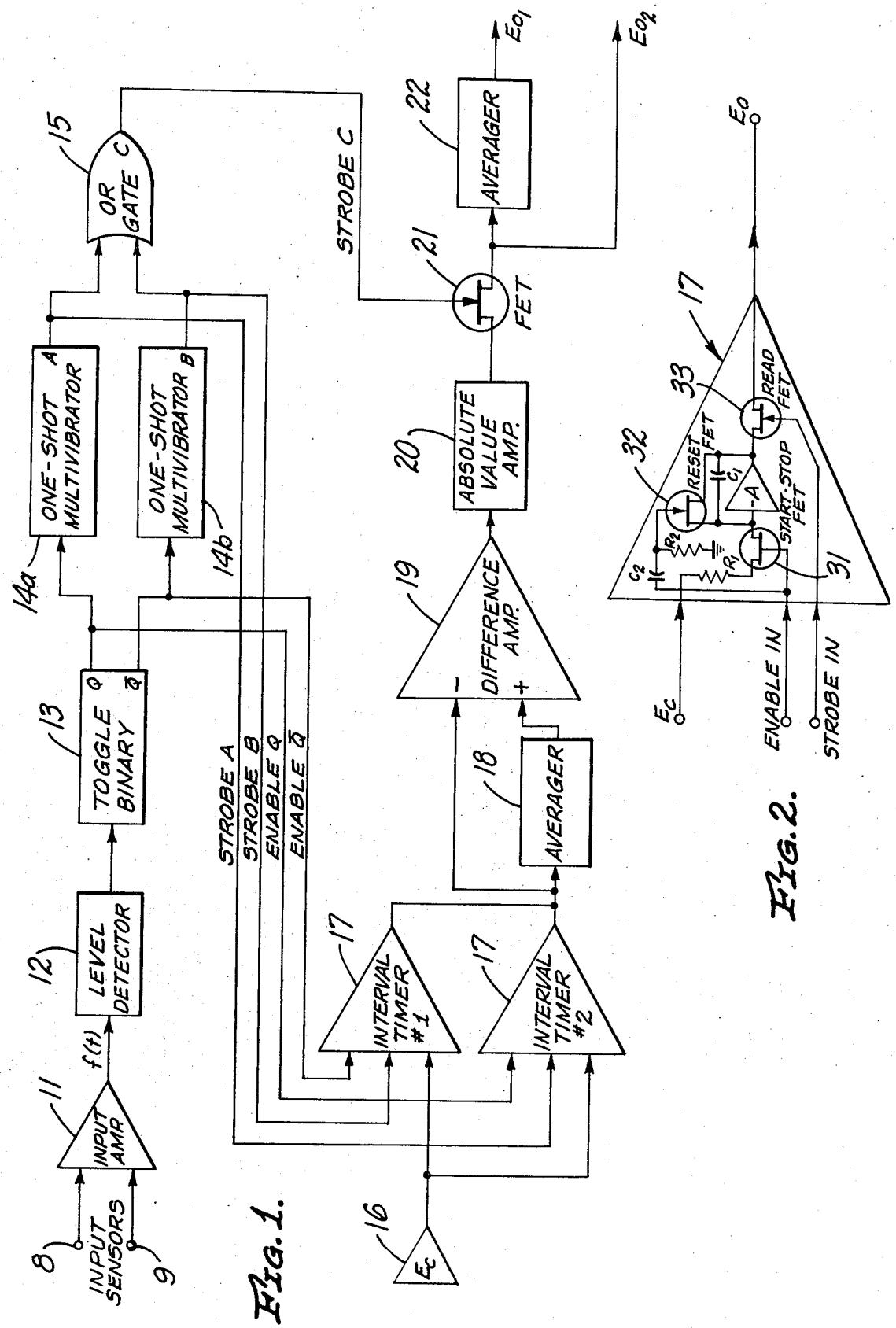

3,699,949

PULSE JITTER MEASUREMENT ESPECIALLY FOR HEART BEAT MEASUREMENT

BACKGROUND OF THE INVENTION

This invention relates to apparatus for the measurement of intervals between pulses of a train of pulses, and in particular to a new and improved apparatus for the measurement of the variation in the interpulse intervals.

One characteristic of a train of pulses is the interval between pulses and the variation in duration of this interval. While the average pulse rate or pulse frequency of the output of an oscillator or other source of electrical pulses may be constant, there still can be wide variations in the interpulse intervals, which variation is sometimes referred to as pulse jitter. The amount of pulse jitter in a pulse train is one of the factors in analyzing a pulse train and it is sometimes desirable to be able to measure the pulse jitter independent of the average pulse rate.

One suitable apparatus for the measurement of pulse jitter is disclosed in our copending application Pulse Jitter Measurement, Ser. No. 56,466, filed July 20, 1970, now U.S. Pat. No. 3,648,688. This earlier apparatus utilizes N+1 interval timers with associated circuitry, where N is in the order of 5 to 10 and higher.

The apparatus of the present invention is intended to provide the same type of measurement while being somewhat simpler and more economical, utilizing only a pair of interval timers.

SUMMARY OF THE INVENTION

The apparatus of the present invention performs similar functions as the earlier apparatus, with changes in the calculation of variability for reasons of space and economy. Instead of storing N values of data, from which calculations are made, in N+1 interval timers, the data is serially lumped together in an exponentially time-weighted averaging circuit. A running N (number of samples) is achieved with a modified RC averaging circuit. Only two interval timers are needed in the present apparatus and N may be increased or decreased by changing the time constant of the averager, with considerable savings in component parts. While the output data (variability of the input function) is not as statistically precise as that of the earlier apparatus, the cost effectiveness is greater for a field operational unit.

In the apparatus, input signal periods (hereafter referred to as f(t)) are processed to yield constant width output pulses whose voltage amplitudes are proportional to the interval between input pulses, and whose repetition rate is equal to the repetition rate of the input pulses. A running average of the amplitudes of these pulses is made, and this average is then subtracted from new instantaneous pulse amplitude values by a difference amplifier. Any difference found during subtraction is a deviation from the mean pulse amplitude, and is rectified and filtered to yield a running average of variations in the period of f(t). The apparatus is particularly suited for the measurement of heart rate variation but is also suitable for measurement of other pulse jitter.

DESCRIPTION OF THE DRAWINGS

FIG. 1 is an electrical block diagram illustrating apparatus for measuring the pulse jitter in a pulse train, such as produced by the heartbeat of a patient, and incorporating a preferred embodiment of the present invention;

FIG. 2 is an electrical diagram of an interval timer suitable for use in the apparatus of FIG. 1.

DESCRIPTION OF THE PREFERRED EMBODIMENT

Figure 3:
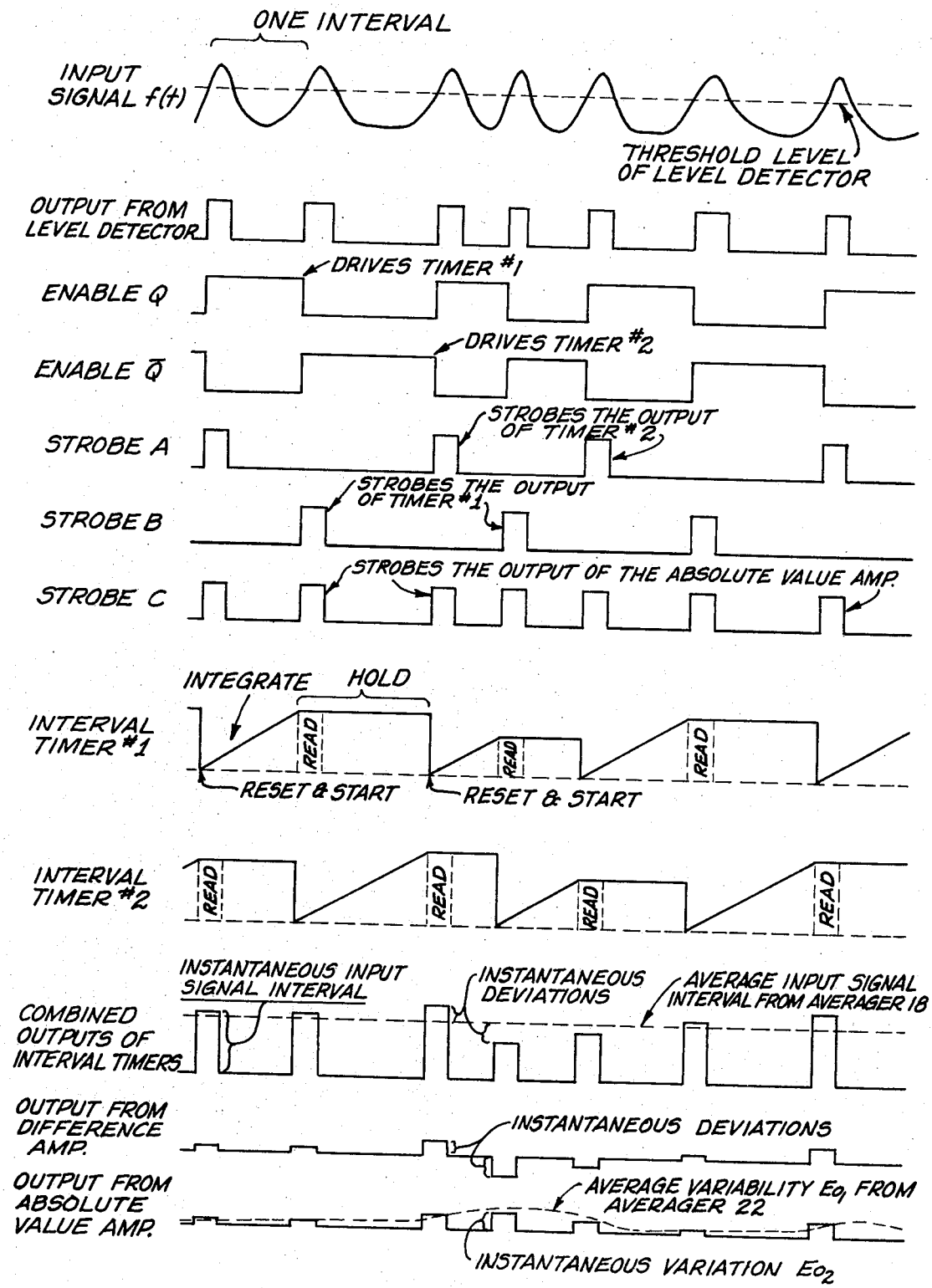
FIG. 3 is a timing diagram illustrating the operation of the apparatus of FIG. 1.

The apparatus comprises three main functional blocks, namely signal conditioning, time-to-voltage conversion, and computation.

The signal conditioning block converts the input waveform of f(t) to logic levels and pulses used in controlling the conversion and computation blocks. The signal conditioning block includes an input amplifier 11, a level detector 12, a toggle binary 13, one-shot multivibrators 14a, 14b, and an OR gate 15.

In the embodiment illustrated, the pulse train is produced by the heartbeat of a patient, but other sources of pulse trains such as oscillators, rotating machinery with appropriate electronic sensors, and the like, may be utilized when desired. Heart beat sensing transducers may be utilized to pick up heartbeat signals of a patient, and are indicated as sensing electrodes 8, 9, placed on the patient for picking up the varying cardiac potentials, with the electrodes connected as inputs to the amplifier 11 which may be a conventional ECG amplifier.

Conditioning begins by amplifying the input waveform (heartbeats, pulses, etc.) from a source 8, 9 (i.e., electrodes or plethysmograph) to a usable voltage level in amplifier 11. This voltage is then fed to the level detector 12 which produces an output pulse each time the input waveform reaches some set threshold value (see FIG. 3). The toggle binary 13 receives pulses from the level detector 12 and changes output state with each new pulse. The toggle binary 13 has two outputs (enable lines Q and $\bar{Q}$) which are 180° out of phase. These lines carry the enable signals to two interval timers 17, and alternately drive the two one-shot multivibrators 14a, 14b. Three constant-width strobing pulses A, B and C are generated by the one-shots 14a, 14b and the OR gate 15. Strobe lines A and B alternately put out a pulse for each input signal cycle, and a pulse appears every cycle on strobe line C. These strobe pulses are adjusted to have a pulse width shorter than the shortest input signal cycle of interest.

The time-to-voltage conversion block comprises a constant voltage source 16 and two interval timers 17. The enable levels and strobe pulses from the signal conditioning block are processed to yield constant width output pulses, whose voltage amplitudes are proportional to the period of f(t) and whose repetition rate is equal to the repetition rate of the input signal.

Each interval timer 17 (FIG. 2) may be a simple "-Miller Integrator" modified to operate as follows: when a pulse appears on the enable line, the reset FET 32 conducts momentarily discharging capacitor $C_1$, resetting any previous voltage in the integrator to zero.

At this time the start-stop FET 31 is conducting, applying a constant voltage Ec from source 16 through resistor $R_1$, and the integrator's output voltage Eo starts to increase linearly with time. When the enable pulse disappears, the integrator stops integrating and holds the value it has reached. The amplitude of the output voltage Eo is therefore proportional to the duration of the enable pulse, which is proportional to the period of f(t).

When the enable pulse disappears, the read FET 33 receives a strobe pulse from one of the one-shots 14a, 14b, permitting the output voltage Eo of the integrator to be entered into the calculations. Thus we have a unit which exhibits no output voltage until the time interval-to-voltage conversion has taken place, and delivers a constant width pulse whose voltage amplitude is proportional to the period of f(t), and automatically resets when new data is entered.

One interval timer can process only every other input interval; therefore two such timers are combined and are alternately enabled and strobed by the toggle binary 13 and the one-shots 14a, 14b. The outputs of the two timers 17 are then tied together to provide combined output voltage pulses.

In the computation block, the series of constant width pulses from the interval timers 17 are manipulated to provide one or more outputs which correspond to the variations in the interval between pulses of the input pulse train. The computation block includes an averager 18, a difference amplifier 19, an absolute value amplifier 20, an FET 21, and another averager 22.

Computation begins by feeding the combined interval timer output pulses into an exponentially time-weighted averager 18, the output voltage of which is proportional to the average amplitudes of the input pulses. An RC integrator with conventional input performs a weighted average over an interval, the length of which is determined by the time constant TC of the integrator. The strobing of input information to the RC integrator of the averager 18 modifies the normal operation so that it integrates over N input periods, instead of time. Therefore if the input information rate were to increase, the weighted average would be based on an increased number of interval samples (i.e., N would increase). In the circuit of FIG. 1, however, the input to the RC integrator of the averager 18 is gated so that current can flow only during the time that a variable amplitude (proportional to the period of f(t)) constant width pulse is applied to it. Since the integrator can only function during that time, the RC time constant now characterizes the number of samples, N, included in the weighted average, of the actual sample rate.

Thus we have achieved a running average which will reflect the average of the last N pulse amplitudes without regard to their rate.

The output voltage of the averager 18 (average f(t) interval) is subtracted from its input voltage pulses (instantaneous f(t) intervals) by the difference amplifier 19. The output voltage of this amplifier 19 is the instantaneous deviation about the mean input signal interval. The absolute value of this voltage may be taken with the absolute value amplifier 20, which yields the instantaneous variations in the period of f(t).

The value of the instantaneous variations is meaningful when a pulse is being strobed into the averager 18. At any other time there will be no signal at the input of the averager to subtract from its output, and during these times of no signal the output of the difference amplifier and the absolute value amplifier will be meaningless. Therefore it is desirable to look at the output of the absolute value amplifier only during the strobing of information to the input of the averager. This may be accomplished by strobing the output of the absolute value amplifier by the FET 21, which is driven by strobe C. Whenever strobe A or B allows information to enter the averager 18, strobe C will be generated allowing the FET 21 to conduct and pass meaningful data. This can be used as output $Eo_2$ for instantaneous variations in input signal intervals.

In many applications of the apparatus, trends in variability are desired. The strobed output of the absolute value amplifier may be fed into the averager 22 identical in function to the averager 18. Because information is strobed into averager 22, it too will integrate over some number of input signal periods M independent of time. The output of this averager yields the running average of variations in the period of f(t).

The time constants of the averagers 18, 22 may be individually set so that the number of input signal periods N used in calculating the average interval at averager 18 may differ from the number of input signal periods M used in averaging the instantaneous variability at averager 22. This flexibility is useful in experimental situations. The outputs $Eo_1$ and $Eo_2$ may be connected to various output circuits, including recording, display or alarm equipment for evaluation.

The pulse jitter measurement apparatus of the present invention provides an output corresponding to instantaneous variations in input signal intervals and another output corresponding to the running average of variations in input signal intervals, while requiring only two interval timers. While a specific embodiment of the apparatus has been described and discussed, particularly for use in the measurement of heart rate variations, other applications of the invention are possible and the embodiment disclosed may be subjected to various changes, modifications and substitutions without necessarily departing from the spirit of the invention.

We claim:

1. In an apparatus for measuring the difference in intervals between pulses of a pulse train, the combination of:

first circuit means having the pulse train as an input for producing a series of constant width pulses, with a constant width pulse for each pulse of the input pulse train and with the amplitude of the constant width pulses proportional to the time intervals between the input pulses;

a first averager having said series of constant width pulses as an input and producing a time-weighted average of said constant width pulses as a first averager output; and a difference amplifier having said series of constant width pulses and said first averager output as inputs and providing an output which is the difference of the inputs thereto, with said output corresponding to the instantaneous variations in the intervals between pulses of the input pulse train.

2. An apparatus as defined in claim 1 including an absolute value amplifier having the output of said difference amplifier as an input and providing an output which is the absolute value of the input thereto.

3. An apparatus as defined in claim 2 including means for coupling the output of said absolute value amplifier to an output circuit at the time of each of said constant width pulses.

4. An apparatus as defined in claim 3 including a second averager having the output of said absolute value amplifier as an input and producing a time-weighted average of said absolute values as an output.

5. An apparatus as defined in claim 3 in which said first circuit means includes:
first and second interval timers for generating output voltages proportional to the duration of an input interval;
means for starting, stopping, and resetting each of said interval timers in sequence in response to successive pulses of the input pulse train; and
means for combining the output voltages of said interval timers to produce said series of constant width pulses.

6. An apparatus as defined in claim 5 in which said means for starting, stopping, and resetting includes:
means for generating in sequence first and second enable signals of durations corresponding to the intervals between the input pulses;
means for connecting said first and second enable signals to said first and second interval timers, respectively, for defining said input intervals;
means for generating in sequence first and second strobe signals of constant width and at times corresponding to the times of the input pulses; and
means for connecting said first and second strobe signals to said first and second interval timers, respectively, for providing an interval timer output voltage after an enable signal goes off.

7. An apparatus as defined in claim 6 including means for actuating said means for coupling in synchronism with said first and second strobe signals.

8. An apparatus as defined in claim 1 including heartbeat sensing transducers for picking up varying heartbeat signals from a patient, and means for amplifying said signals to provide the pulse train.

* * * * *